US009197612B2

(12) United States Patent
Campbell et al.

(10) Patent No.: US 9,197,612 B2
(45) Date of Patent: Nov. 24, 2015

(54) APPARATUS AND METHOD FOR DEPLOYING ENCRYPTED MOBILE OFF-LINE WEB APPLICATIONS

(71) Applicant: SYMBOL TECHNOLOGIES, INC., Lincolnshire, IL (US)

(72) Inventors: Darryn Campbell, Southampton (GB); Geoffrey R. Day, Corsham (GB); Paul A. Henderson, Swindon (GB); James R. Morley-Smith, High Wycombe (GB)

(73) Assignee: Symbol Technologies, LLC, Holtsville, NY (US)

( * ) Notice: Subject to any disclaimer, the term of this patent is extended or adjusted under 35 U.S.C. 154(b) by 208 days.

(21) Appl. No.: 13/962,190

(22) Filed: Aug. 8, 2013

(65) Prior Publication Data
US 2015/0046705 A1 Feb. 12, 2015

(51) Int. Cl.
H04L 29/06 (2006.01)
H04L 29/08 (2006.01)

(52) U.S. Cl.
CPC ........ *H04L 63/0442* (2013.01); *H04L 63/0428* (2013.01); *H04L 67/34* (2013.01)

(58) Field of Classification Search
CPC .................... G06F 21/6218; G06F 2221/2107; H04L 63/123
USPC ........................ 713/150, 161, 165, 167; 726/2
See application file for complete search history.

(56) References Cited

U.S. PATENT DOCUMENTS

| | | | |
|---|---|---|---|
| 7,580,899 B2 | 8/2009 | Adamson | |
| 7,650,390 B2 | 1/2010 | Arner et al. | |
| 7,817,981 B2 | 10/2010 | Coppinger | |
| 7,996,361 B1 * | 8/2011 | Shah et al. | 707/626 |
| 8,032,940 B1 * | 10/2011 | Dhanani | 726/26 |
| 8,321,953 B2 | 11/2012 | Jevans | |
| 2007/0249320 A1 | 10/2007 | Coppinger et al. | |
| 2008/0183841 A1 | 7/2008 | Isokawa et al. | |
| 2010/0232409 A1 * | 9/2010 | Kim et al. | 370/338 |
| 2011/0066681 A1 | 3/2011 | Shiota et al. | |
| 2013/0060885 A1 | 3/2013 | Fu | |
| 2013/0262563 A1 * | 10/2013 | Lu | 709/203 |

FOREIGN PATENT DOCUMENTS

WO 2006131729 A1 12/2006

* cited by examiner

*Primary Examiner* — Anthony Brown

(57) ABSTRACT

A mobile device is configured to execute encrypted source files and includes a transceiver configured to receive an archive file comprising encrypted source files. The mobile device also includes a storage unit configured to store the received archive file. A local web server in the mobile device is configured to interpret a format of the received archive file, retrieve at least one source file from the archive file in response to a request from a device browser, decrypt the retrieved source file, and forward unencrypted information associated with the decrypted source file to the device browser. The device browser in the mobile device is configured to display the unencrypted information.

16 Claims, 3 Drawing Sheets

APPARATUS AND METHOD FOR DEPLOYING ENCRYPTED MOBILE OFF-LINE WEB APPLICATIONS

BACKGROUND OF THE INVENTION

Mobile devices, for example, smart phones, mobile or portable phones, tablets, and personal digital assistants, may include mobile applications that are executed on the mobile devices. These applications may be web-based applications written, for example, in HyperText Markup Language (HTML) or JAVA scripts. Pages of the application may be displayed using a Web browser. For example, pages of the application may be displayed with an Internet Explorer based browser or Chrome based browser operating on a mobile device, whether or not the mobile device is connected to the Internet or a network. The source code for the application may either be stored on the mobile device or on a remote server. In order to execute the application, the mobile device is configured to directly access the application source code that is stored either on the mobile device or on the remote server.

When the application source code is stored on the remote server, however, the mobile device may be unable retrieve the application source code when there is no connection with the remote server. For instance, if the mobile device is in a partially connected environment (for example, an environment where wireless connectivity is inconsistent), when the mobile device loses its connection with the remote server the mobile device will be unable to retrieve the application source code from the remote server. During these periods when the connection with the remote server is broken, the mobile device will be unable to execute the application. In these circumstances, it may be preferable to have the application source code stored on the mobile device, so that the application source code is always available.

When the application source code is stored on the mobile device, the data or other information associated with the application may be synchronized with network components during periods when the mobile device has network connectivity. However, when the application source code is stored on the mobile device, the application source code is typically saved as plain text that is not encrypted because a typical Web browser has no way of accessing encrypted source code. Anyone with access to the mobile device may therefore be able to retrieve the unencrypted application source code from the mobile device and execute the retrieved application source code on another computing device without permission.

A current option for encrypting the source code associated with off-line mobile web applications is to store the source code on an encrypted drive or an encrypted file system in the mobile device. Encrypted drives are designed to protect against data access if the mobile device or its storage card is lost. Encrypted drives do not prevent retrieval of plain text versions of the source files if the person copying the source code without permission has authorized access to the mobile device. Furthermore, not all mobile platforms support encrypted drives or file systems. Another option for protecting unencrypted source code is to obfuscate the source file. With this solution, it is still possible to easily extract and reproduce the application obtained from the plain text obfuscated files.

Accordingly, there is a need for an improved apparatus and method for deploying an encrypted mobile off-line web application.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
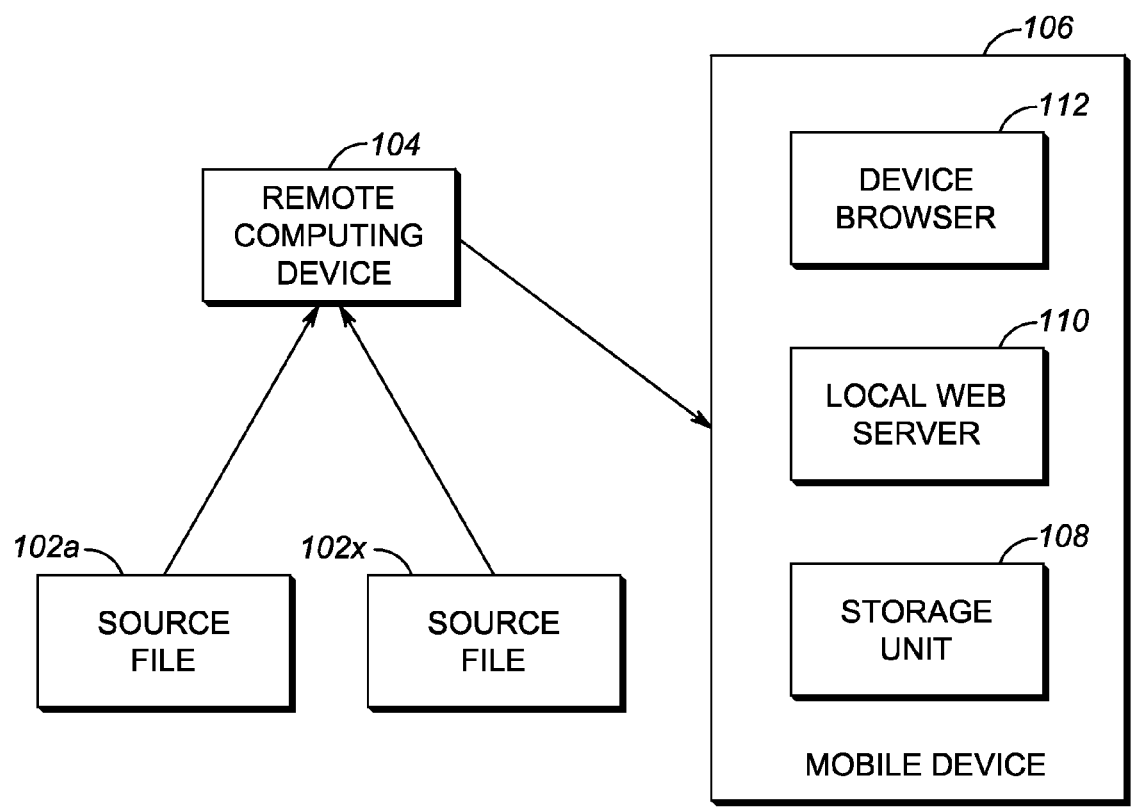
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to systems and method for executing encrypted source files on a mobile device. The mobile device includes a transceiver configured to receive an archive file comprising encrypted source files. The mobile device also includes a storage unit configured to store the received archive file. A local web server in the mobile device is configured to interpret a format of the received archive file, retrieve at least one source file from the archive file in response to a request from a device browser, decrypt the retrieved source file, and forward unencrypted information associated with the decrypted source file to the device browser. The device browser in the mobile device is configured to display the unencrypted information.

FIG. 1 is a block diagram of a system used in accordance with some embodiments. System 100 includes source files 102 (i.e., source files 102*a*-102*x*) for an off-line web application that may be executed a mobile device 106. The source file(s) 102 may be created on a remote computing device 104, such as a laptop connected to the mobile device 106 via a wired or wireless connection. Non-limiting examples of mobile device 106 include mobile phones, smart phones, or tablets that are capable of executing the source files subsequent to receiving the source files from computing device 104. The mobile device 106 is configured to execute the source files for the off-line web application during periods with or without a network connection. Source files 102 may include a collection of HyperText Markup Language (HTML), JAVA scripts and other resource files such as images. Subsequent to creating the source files 102 on remote computing device 104 or on another platform/device, the source files may be stored as unencrypted, plain text files that are susceptible to unauthorized access, such as unauthorized copying. To prevent unauthorized access, the source files 102 may be encrypted on the computing device 104. The encrypted source files 102 may then be transferred to mobile device 106 and stored on storage unit 108.

In an embodiment, the unencrypted source files 102 files stored on remote computing device 104 may be encrypted with an encryption algorithm that turns the source files into unreadable ciphertext. Each source file may be individually encrypted and all of the encrypted source files 102 may be stored in a directory structure, for example, a single directory tree structure. The encrypted source file and the associated directory structure and the file table of the encrypted files, may be maintained with, for example, open source zip and unzip utilities employing, for example, a Lempel-Ziv-Welch (LZW) algorithm. The encryption program may include, for example, an open source implementation of an asymmetric key encryption algorithm, such as keyCzar, and may use a public key issued by a certificate authority. The output from the encryption program may be a single, zipped archive file which can be transferred from the remote computing device 104 to mobile device 106, either manually or through another deployment method. For example, the single, zipped archive file could be automatically downloaded to mobile device 106 when mobile device 106 is within a wireless local area network coverage range or the archive file could be downloaded to mobile device 106 when mobile device 106 is connected to the remote computing device 104.

Mobile device 106 is also configured to include a local web server 110 and a device browser 112. Local web server 110 is configured to interpret the format of the downloaded archive file and retrieve at least one source file from the downloaded archive file in response to a request received from device browser 112. Local web server 110 is also configured to decrypt the retrieved source file and send the decrypted source file to the device browser 112. Device browser 112 may be a Web browser, for example, an Internet Explorer based browser or Chrome based browser operating on the mobile device 106. In some embodiments, device browser 112 may be an HTML renderer which is configured to request pages and resources from the local web server 110 being executed on a specified port on the mobile device 106.

Local web server 110 may be executed in encrypted mode or unencrypted mode. If local web server 110 is running in encrypted mode, requests from device browser 112 for source files are translated into read requests of the encrypted developer application that was used to encrypt the local web server 110. As noted previously, each source file may be individually encrypted making it possible for local web server 110 to unzip and extract an array of encrypted bytes from the downloaded archive file. The extracted encrypted bytes may be associated with specific page(s) of the application being executed on device browser 112. Local web server 110 may then decrypted the extracted encrypted bytes using, for example, the private key. Therefore, the application may be executed on the mobile device without the source files of the application being available for unauthorized access or extraction.

In some embodiment, local web server 110 may not serve HTML viewers being executed in remote locations to maintain the security of the encrypted data. Local web server 110 may be delivered to the mobile device in a separate compiled library as a closed source application executable, if the local web server is delivered as part of a wider open source system. This maintains the security of the private key that the local web server 110 may use to decrypt the encrypted source files.

Figure 2:
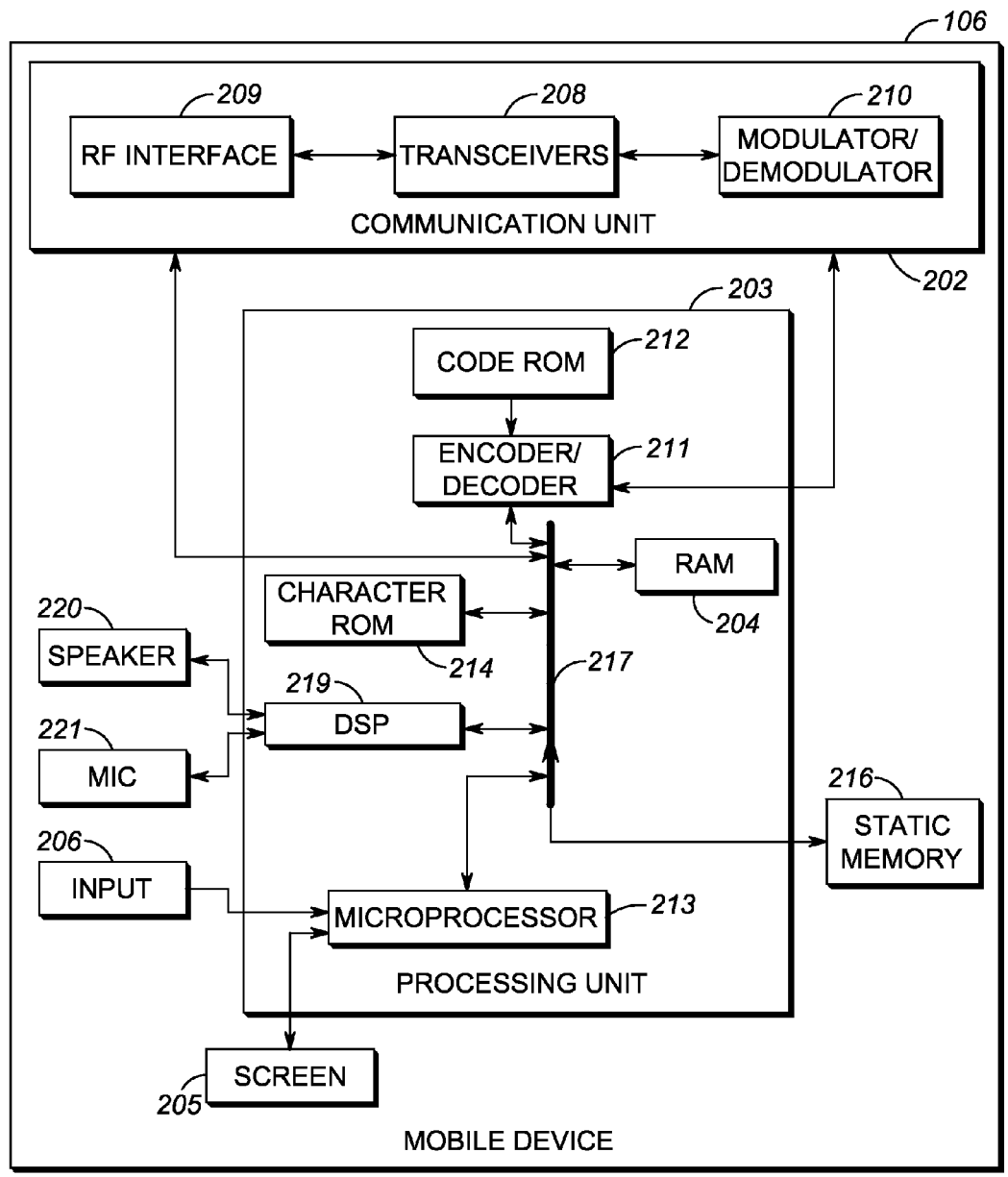
FIG. 2 is a block diagram of a mobile device used in accordance with some embodiments.

FIG. 2 is a block diagram of the mobile device used in accordance with some embodiments. The mobile device 106 includes a communications unit 202 coupled to a common data and address bus 217 of a processing unit 203. The mobile device 106 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203.

The processing unit 203 is configured to execute the functions of the local web server and the device browser. The processing unit 203 may include an encoder/decoder 211 with an associated code ROM 212 for storing data for encoding and decoding voice, data, control, or other signals that may be transmitted or received by the mobile device. The processing unit 203 may further include a microprocessor 213 coupled, by the common data and address bus 217, to the encoder/decoder 211, a character ROM 214, a RAM 204, and a static memory 216. The processing unit 203 may also include a digital signal processor (DSP) 219, coupled to the speaker 220, the microphone 221, and the common data and address bus 217, for operating on audio signals received from one or more of the communications unit 202, the static memory 216, and the microphone 221.

The communications unit 202 may include an RF interface 209 configurable to communicate with network components, and other user equipment within its communication range. The communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 202 may include one or more local area network or personal area network transceivers such as Wi-Fi transceivers perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 210 that is coupled to the encoder/decoder 211. The character ROM 214 stores code for decoding or encoding data such as control, request, or instruction messages, channel change messages, and/or data or voice messages that may be transmitted or received by the mobile device. Static memory 216 may store operating code associated with processing instructions being executed on the mobile device 106.

Figure 3:
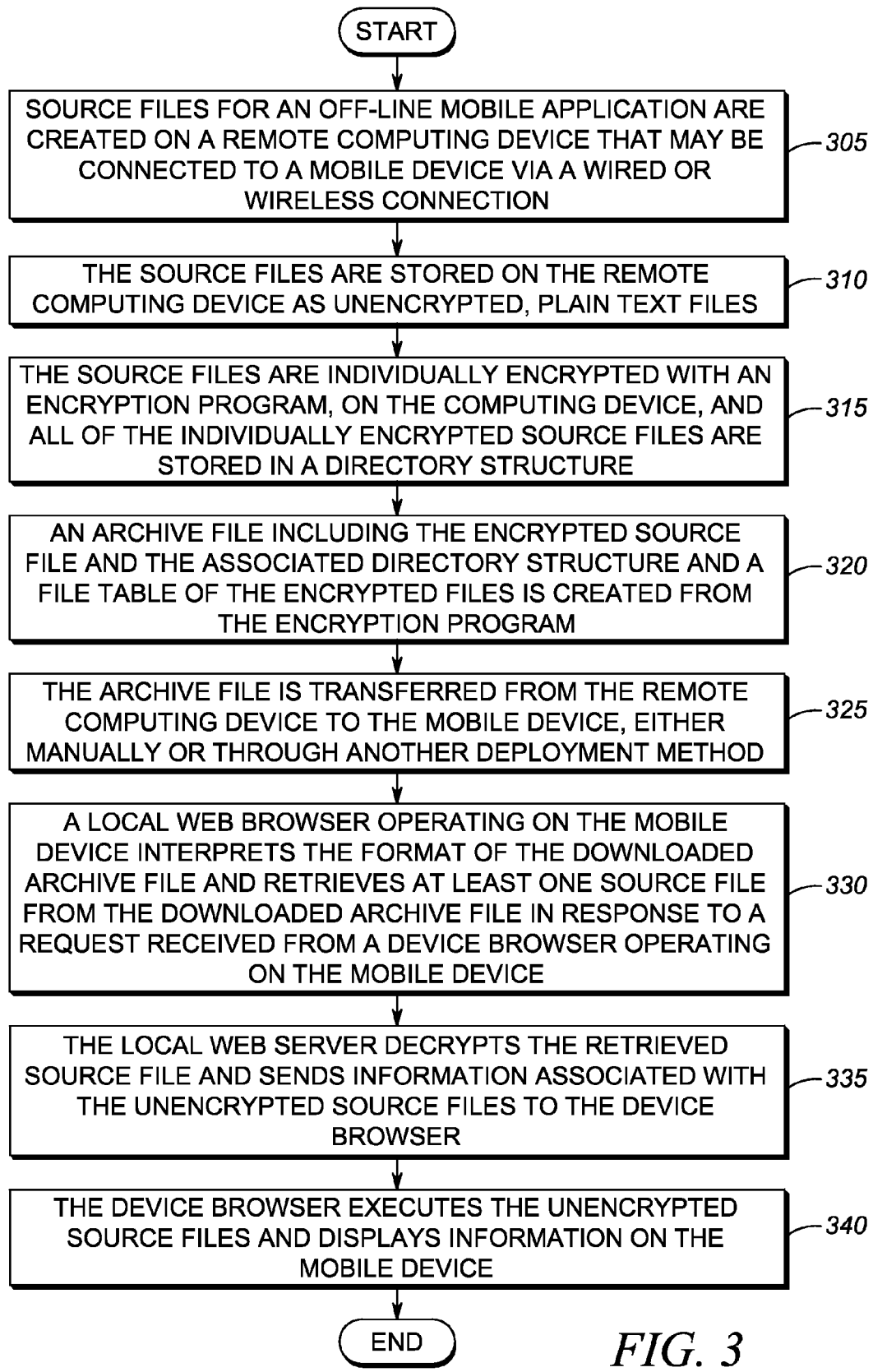
FIG. 3 is a flow diagram of the steps implemented in accordance with some embodiments.

FIG. 3 is a flow diagram of the steps implemented in accordance with some embodiments. At 305, source files for an off-line mobile application are created on a remote computing device that may be connected to a mobile device via a wired or wireless connection. At 310, the source files are stored on the remote computing device as unencrypted, plain text files. At 315, the source files are individually encrypted with an encryption program, on the computing device, and all of the individually encrypted source files are stored in a directory structure. At 320, an archive file including the encrypted source file and the associated directory structure and a file table of the encrypted files is created from the encryption program. At 325, the archive file is transferred from the remote computing device to the mobile device, either manually or through another deployment method.

At 330, a local web browser operating on the mobile device interprets the format of the downloaded archive file and retrieves at least one source file from the downloaded archive file in response to a request received from a device browser operating on the mobile device. At 335, the local web server decrypts the retrieved source file and sends information associated with the unencrypted source files to the device browser. At 340, the device browser executes the unencrypted source files and displays information on the mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile device operable to deploy an encrypted mobile web application off-line from a network connection, comprising,
   a transceiver operable to receive an archive file comprising encrypted source files of web applications;
   a storage unit operable to store the received archive file;
   a local web server operable to:
      interpret a format of the received archive file,
      retrieve at least one source file from the archive file in response to a request from a device browser,
      decrypt the retrieved source file, and
      forward the decrypted source file to the device browser; and
   the device browser operable to execute at least a portion of the decrypted source file and display unencrypted information.

2. The mobile device of claim 1, wherein the archive file comprises individually encrypted source files stored in a single directory tree structure.

3. The mobile device of claim 1, wherein the archive file is encrypted with an asymmetric key encryption algorithm.

4. The mobile device of claim 1, wherein the transceiver is operable to automatically receive the archive file when the mobile device is within a local area network coverage range.

5. The mobile device of claim 1, wherein the device browser is a Web browser.

6. The mobile device of claim 1, wherein the device browser is a Hyper Text Markup Language (HTML) renderer which is operable to request unencrypted HTML pages from the local web server, the local web server being executed on a specified port on the mobile device.

7. The mobile device of claim 1, wherein when the local web server is being executed in an encrypted mode the request from the device browser is translated into a read request of an encrypted developer application that was used to encrypt the local web server.

8. The mobile device of claim 1, wherein the local web server is operable to decrypt the retrieved source file with a private key.

9. The mobile device of claim 1, wherein the local web server is operable to deny requests from a device browser being executed in a remote location.

10. The mobile device of claim 1, wherein the transceiver is operable to receive an application executable for the local web server in a separate compiled library as a closed source application to maintain the security of a decryption key.

11. A method for deploying an encrypted mobile web application off-line from a network connection, comprising,
receiving, by a mobile device, an archive file comprising encrypted source files of web applications;
storing, on the mobile device, the received archive file;
interpret, by the mobile device, a format of the received archive file;
retrieving using the interpreted format, by the mobile device, at least one source file from the archive file responsive to receiving a request from a device browser being executed on the mobile device;
decrypting, by the mobile device, the retrieved source file;
forwarding, by the mobile device, the decrypted source file to the device browser;
execute, by the mobile device, at least a portion of the decrypted source file; and
displaying, by the mobile device, unencrypted information on the device browser.

12. The method of claim 11, wherein the receiving comprises automatically receiving the archive file when the mobile device is within a local area network coverage range.

13. The method of claim 11, wherein the receiving comprises receiving the archive file when the mobile device is connected to a computing device storing the archive file.

14. The method of claim 11, further comprising translating the request from the device browser into a read request of an encrypted developer application that was used to encrypt a local web server operating on the mobile device, the local web server being operable to perform the interpreting, retrieving, decrypting and forwarding.

15. The method of claim 11, wherein the decrypting comprises decrypting the retrieved source file with a private key.

16. The method of claim 11, further comprising denying requests from a device browser being executed in a remote location.

\* \* \* \* \*